F. LAMBERT.
METER.
APPLICATION FILED OCT. 1, 1919.
1,377,985.
Patented May 10, 1921.
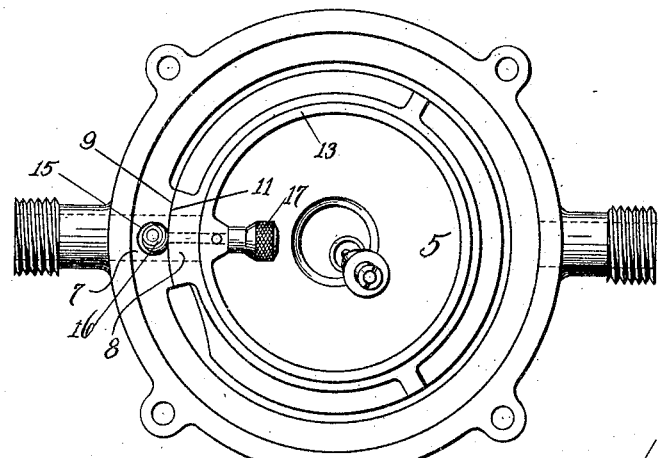
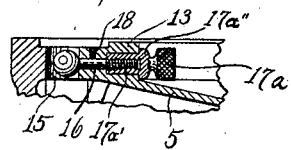
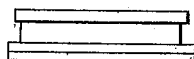
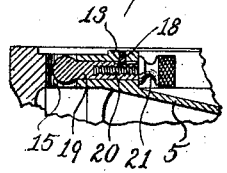
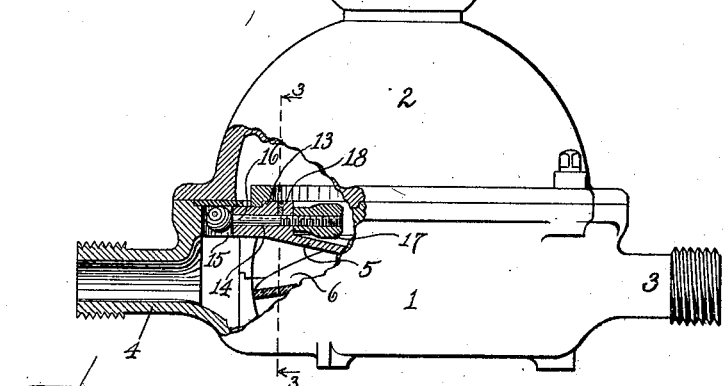
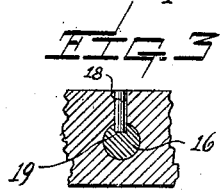
INVENTOR.
Frank Lambert
BY
H. M. Marble
ATTORNEY.

UNITED STATES PATENT OFFICE.

FRANK LAMBERT, OF BROOKLYN, NEW YORK, ASSIGNOR TO THOMSON METER COMPANY, OF BROOKLYN, NEW YORK, A CORPORATION OF NEW JERSEY.

METER.

1,377,985.    Specification of Letters Patent.    Patented May 10, 1921.

Application filed October 1, 1919. Serial No. 327,652.

*To all whom it may concern:*

Be it known that I, FRANK LAMBERT, a citizen of the United States of America, and resident of the borough of Brooklyn, county of Kings, city and State of New York, have invented certain Improvements in Meters, of which the following is a specification.

My invention relates generally to improvements in meters, and particularly to improved means for drawing together the port-containing surfaces of the meter casing and measuring chamber of meters of the nutating disk type.

In U. S. Letters Patent No. 1,155,666, dated Oct. 5, 1915, I have illustrated, described and claimed an arrangement for this purpose wherein one of the two said meter members, viz., the meter casing and the measuring chamber, is provided with a screw head recess, and the other with a screw-threaded recess, and a headed screw having its head in such head recess is screwed into such screw-threaded recess and so draws the two members of the meter together. In practice it has been found that the turning of this screw, to draw the meter members together or to separate them, is an undesirably slow proceeding, and moreover, usually requires a special tool. The present invention obviates these objections, the shank of the screw being made long enough to extend clear through the annular wall of the measuring chamber and to receive a screw-nut which may be turned readily and quickly.

My invention consists, therefore, in a construction wherein the two members of the meter, above referred to, are provided, the one with a screw-head recess and the other with a screw-hole registering therewith, such hole extending completely through the flange or other projection or wall in which it is located, a headed screw having its head located in such recess and its shank located in and extending through such screw-hole and provided, beyond such hole, with a holding nut. Commonly, to prevent rotation of the screw when the nut is being screwed up or released, the member of the meter containing the said screw-hole is provided with a pin projecting into the said screw-hole sufficiently to engage a key-slot in the shank of the screw.

The object of my invention is to make more easy and rapid the drawing together or separation of the said two parts of the meter.

I will now proceed to describe my invention with reference to the accompanying drawings, illustrating one embodiment thereof, and will then point out the novel features in claims. In said drawings:

Figure 1 shows a top view of the measuring chamber and lower member of the meter casing, of a meter of the type referred to and provided with my invention. Fig. 2 shows a side elevation of the meter, a portion of the casing and measuring chamber therein being sectioned vertically, a portion of the wall of the meter casing being broken away for that purpose. Fig. 3 is a fragmentary vertical section, on the line 3—3 of Fig. 2. Figs. 4 and 5 are fragmentary sectional views illustrating alternative constructions.

In the drawings, 1 indicates the lower section of the meter casing, and 2 the upper section thereof. As usual, the lower section 1 is provided with projecting connecting-studs, 3 and 4, containing the inlet and outlet ports respectively of said casing. 5 is the measuring chamber, located within the casing 1—2 and formed in two parts, as usual, and 6 the disk piston.

9 and 11 are registering projections or ribs of the meter casing 1—2, and the measuring chamber 5, respectively, the adjacent surfaces of which must be held tightly together, for these ribs contain registering ports, 7 and 8, as indicated in dotted lines in Fig. 1, and unless the said adjacent surfaces be held together tightly, leakage will occur. To so hold the parts together, a screw 16 is provided, the head of which enters within a recess 15 of the meter casing, while the shank of the screw extends through a screw-hole 14 in the usual annular flange 13 of the top member of the measuring chamber 5, being provided with a thumb screw-nut 17 which, in use, bears against the inner surface of the flange 13, so holding the measuring chamber and meter casing tightly together. Obviously, since the nut 17 is readily accessible once the top of the meter casing has been removed, or before the said top has been put in place, it is easy to turn the nut by means of the fingers or by means of pliers. To prevent the screw itself from turning while this is being done, the measuring chamber is commonly provided with a pin 18 projecting slightly into the screw-hole and there engaging a key-slot 19 of the screw 16, as shown particularly in Fig. 3.

In the alternative construction illustrated in Fig. 4, the nut, here designated by numeral 17ª, has a shank 17ª′ fitting within a recess of the flange 13, and has also a shoulder 17ª″ bearing against the inner surface of the flange 13. By this construction the length of the screw 16 may be much less than would otherwise be the case. In the alternative construction illustrated in Fig. 5, the screw 16 of the previous figures is replaced by a round headed member 19, itself provided with a screw-threaded recess into which enters a screw 20 projecting thereinto from the inner side of the flange 13, said screw 20 being provided with a head 21, a shoulder of which bears against the inner side of the flange 13. In this latter construction, the member 19 is no less a screw than in the preceding construction, but is a screw having an internal thread; and the member 21 is in fact a nut having an external thread instead of an internal thread, as is ordinarily the case.

In the construction shown in my said Patent No. 1,155,666, not only is the head of the screw so nearly inaccessible that a special tool is required to turn it, but if, in backing off the screw preparatory to removing the measuring chamber, the screw be turned too far out, it will press against the rear surface of the screw-head recess, and so interfere with the removal of the measuring chamber, by pressing that chamber against the opposite side of the meter casing. Likewise, unless the screw be in very nearly the right position, it interferes with the insertion of the measuring chamber into the meter casing. Both of these objections are overcome in the construction herein described, since the screw slides freely in the screw hole, 14 before the screw-nut is turned up tight.

What I claim is:

1. In a meter, a casing containing a measuring chamber, said casing and chamber having coacting projections on their side walls, the adjacent surfaces of said projections being shaped to form a tight joint, said projections being provided with ports arranged to register when the chamber is in position within the casing, the projection on the measuring chamber having a hole and the projection on the casing having a recess, a fastening member slidable in said hole when loosened and having a head adapted to enter said recess, and means engaging said member for drawing said head against the walls of said recess and thereby tightening the joint between said coacting surfaces, the head of said member passing freely into and out of said recess when said member is loosened to permit ready insertion of the measuring chamber into the casing and its ready removal therefrom.

2. In a meter, a casing containing a measuring chamber, said casing and chamber having coacting projections on their side walls, the adjacent surfaces of said projections being shaped to form a tight joint, said projections being provided with ports arranged to register when the chamber is in position within the casing, the projection on the measuring chamber having a hole and the projection on the casing having a recess, a screw in said hole having a head adapted to enter said recess, the shank of said screw being freely slidable in said hole when loosened, and a nut on the inner end of said screw for drawing said head against the walls of said recess and thereby tightening the joint between said coacting surfaces, the head of said screw passing freely into and out of said recess when the nut is loosened to permit ready insertion of the measuring chamber into the casing and its ready removal therefrom.

3. In a meter, a casing containing a measuring chamber, said casing and chamber having coacting projections on their side walls, the adjacent surfaces of said projections being shaped to form a tight joint, said projections being provided with ports arranged to register when the chamber is in position within the casing, the projection on the measuring chamber having a hole and the projection on the casing having a recess, a screw in said hole having a head adapted to enter said recess, the shank of said screw being freely slidable in said hole when loosened, a nut on the inner end of said screw for drawing said head against the walls of said recess and thereby tightening the joint between said coacting surfaces, the head of said screw passing freely into and out of said recess when the nut is loosened to permit ready insertion of the measuring chamber into the casing and its ready removal therefrom, and means to prevent turning of the screw within the hole while the nut is being turned.

In testimony whereof I have signed this specification in the presence of two subscribing witnesses.

FRANK LAMBERT.

Witnesses:
 SETH O. HIGLEY,
 THOS. E. IRWIN.